United States Patent
Ide

(10) Patent No.: US 7,154,573 B2
(45) Date of Patent: Dec. 26, 2006

(54) ELECTRO-OPTICAL DEVICE AND ELECTRONIC APPARATUS INCLUDING THE SAME

(75) Inventor: Katsuya Ide, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 63 days.

(21) Appl. No.: 10/921,104

(22) Filed: Aug. 19, 2004

(65) Prior Publication Data

US 2005/0094058 A1 May 5, 2005

(30) Foreign Application Priority Data

Oct. 29, 2003 (JP) .............................. 2003-369056

(51) Int. Cl.
- G02F 1/1335 (2006.01)
- G02F 1/13 (2006.01)
- G02F 5/30 (2006.01)
- F21V 19/04 (2006.01)
- G03B 21/14 (2006.01)

(52) U.S. Cl. ...................... 349/96; 349/117; 349/194; 359/485; 359/490; 359/492; 359/494; 359/497; 359/499; 359/501; 362/19; 353/29

(58) Field of Classification Search ................ 349/96, 349/117, 194; 359/485, 490, 492, 494, 497, 359/499, 501; 362/19; 353/20
See application file for complete search history.

(56) References Cited

U.S. PATENT DOCUMENTS 5,097,352 A * 3/1992 Takahashi et al. ............ 349/57

FOREIGN PATENT DOCUMENTS

| JP | 356016111 A | * | 2/1981 |
| JP | 360041021 A | * | 3/1985 |
| JP | 402101426 A | * | 4/1990 |
| JP | 410260398 A | * | 9/1998 |
| JP | 2001-318226 | | 11/2001 |
| JP | A-2003-21832 | | 1/2003 |

* cited by examiner

Primary Examiner—Dung T. Nguyen
Assistant Examiner—Hoan C. Nguyen
(74) Attorney, Agent, or Firm—Oliff & Berridge, PLC

(57) ABSTRACT

To provide an electro-optical device displaying high-contrast images in all directions due to the orthogonality of the polarization axes of the polarizers by improving the structure of the polarizers, and an electronic apparatus including the same. In an electro-optical device 1, a polarizing sheet 130 surrounds a virtual axis line L extending vertically substantially in the center of the liquid-crystal panel 100. A portion of the cylindrical polarizing sheet centered on the virtual axis line L adjacent to the back face of the liquid-crystal panel 100 is defined as a first polarizer 140 and a portion of the cylindrical polarizing sheet centered on the virtual axis line L adjacent to the front face of the liquid-crystal panel 100 is defined as a second polarizer 150. As a result, the first polarizer 140 and the second polarizer 150 are disposed in cross-Nicol arrangement.

9 Claims, 6 Drawing Sheets

ELECTRO-OPTICAL DEVICE AND ELECTRONIC APPARATUS INCLUDING THE SAME

BACKGROUND OF THE INVENTION

1. Field of Invention

The present invention relates to an electro-optical device holding liquid crystal as an electro-optical substance between a pair of transmissive substrates, and to an electronic apparatus including the same.

2. Description of Related Art

Electro-optical devices, each including a liquid-crystal panel holding twisted nematic liquid crystal (TN liquid crystal), whose molecules are twisted, between a pair of transmissive substrates, are mounted in electronic apparatuses such as direct-view displays and projection displays.

In each electro-optical device, as shown in FIGS. 5(A) and 5(B), a first polarizer 140 and a second polarizer 150 are bonded to the back face and the front face, respectively, of a liquid-crystal panel 100. The first polarizer 140 and the second polarizer 150 are disposed in cross-Nicol arrangement. When liquid crystal molecules in pixels of the liquid-crystal panel 100 are twisted, light incident on the first polarizer 140 is linearly polarized by the first polarizer 140 in a predetermined direction, the polarization axis of the incident light is twisted in the pixels, and the light passes through the second polarizer 150. In contrast, when the liquid crystal molecules in the pixels are not twisted by an applied electric field, the polarization axis of the incident light is not twisted and the light does not pass through the second polarizer 150. Therefore, predetermined images can be displayed by controlling the molecular alignment of the liquid crystal in each pixel by controlling the electric field in each pixel, as is disclosed in Patent Document 1, for example.

[Patent Document 1] Japanese Unexamined Patent Application Publication No. 2003-21832.

SUMMARY OF THE INVENTION

The first polarizer 140 and the second polarizer 150 oppose each other and are separated by the liquid-crystal panel 100. A polarization axis 141 of the first polarizer 140 is orthogonal to a polarization axis 151 of the second polarizer 150 when viewed from the direction normal to the image display surface of the liquid-crystal panel 100, namely in the direction of an arrow L1. However, the polarization axis 141 of the first polarizer 140 is not orthogonal to the polarization axis 151 of the second polarizer 150 when viewed from a direction oblique from the normal direction, represented as arrows L2 and L3. Consequently, the liquid-crystal panel 100 disadvantageously exhibits a low contrast when viewed obliquely in the known electro-optical device.

When the polarizers 140 and 150 are directly bonded to the liquid-crystal panel 100, as in the known electro-optical device, many hours are required in stripping the polarizers 140 and 150 for reworking. Furthermore, since large stress is inevitably applied to the substrates of the liquid-crystal panel 100 when the polarizers 140 and 150 are stripped, the substrates are deformed and cell gaps are changed, thereby resulting in a very low display quality.

Accordingly, an object of the present invention is to provide an electro-optical device displaying high-contrast images in all directions due to the orthogonality of the polarization axes of the polarizers by improving the structure of the polarizers, and to provide an electronic apparatus including the same.

To solve the above-described problems, an electro-optical device according to the present invention includes a liquid-crystal panel holding liquid crystal between a pair of transmissive substrates; a first polarizer disposed adjacent to the back face of the liquid-crystal panel; and a second polarizer disposed adjacent to the front face of the liquid-crystal panel in cross-Nicol arrangement together with the first polarizer. At least one of the first polarizer and the second polarizer is curved and surrounds a virtual axis line defined substantially in the center of the liquid-crystal panel.

In the present invention, both the curved first polarizer and the curved second polarizer preferably surround the virtual axis line. With this arrangement, changes in the angle defined by the polarization axes of the pair of polarizers can be reliably prevented even when the liquid-crystal panel is viewed obliquely, and images exhibit a high contrast in all directions.

In the present invention, both the curved first polarizer and the curved second polarizer are preferably centered on the virtual axis line.

In the present invention, the first polarizer and the second polarizer are preferably composed of a single polarizing sheet surrounding the virtual axis line, adjacent to the back face and the front face, respectively, of the liquid-crystal panel. With this arrangement, since the angle defined by the polarization axes of those polarizers is always constant even when the liquid-crystal panel is viewed from all directions, images exhibit a high contrast in all directions.

In the present invention, a seam at the ends of the polarizing sheet is preferably disposed so that a side edge of the liquid-crystal panel is aligned with the seam.

In the present invention, the liquid-crystal panel is preferably disposed substantially in the center of a transparent cylindrical container surrounding the virtual axis line, and the polarizing sheet is preferably provided along the inner surface or the outer surface of the cylindrical container.

In the present invention, the polarizing sheet is preferably fixed on the inner surface or the outer surface of the cylindrical container.

In the present invention, the polarizing sheet is preferably provided along the inner surface of the cylindrical container.

In the present invention, openings of the cylindrical container are preferably shielded by light-shielding members.

The electro-optical device according to the present invention is applicable to electronic apparatuses such as large-format display apparatuses.

In the present invention, a first polarizer and a second polarizer are disposed in cross-Nicol arrangement adjacent to the back face and the front face, respectively, of a liquid-crystal panel, and at least one of the first polarizer and the second polarizer is curved and surrounds a virtual axis line defined substantially in the center of the liquid-crystal panel. Thus, the angle defined by the polarization axes of a pair of polarizers does not change significantly even when the liquid-crystal panel is viewed obliquely compared to the arrangement when a pair of polarizers are parallel to each other. Consequently images exhibit a high-contrast even when the liquid-crystal panel is viewed obliquely.

DETAILED DESCRIPTION OF PREFERRED EMBODIMENTS

Embodiments of the present invention will now be described with reference to the drawings.

[Basic Structure of Electro-optical Device]

Figure 1A:
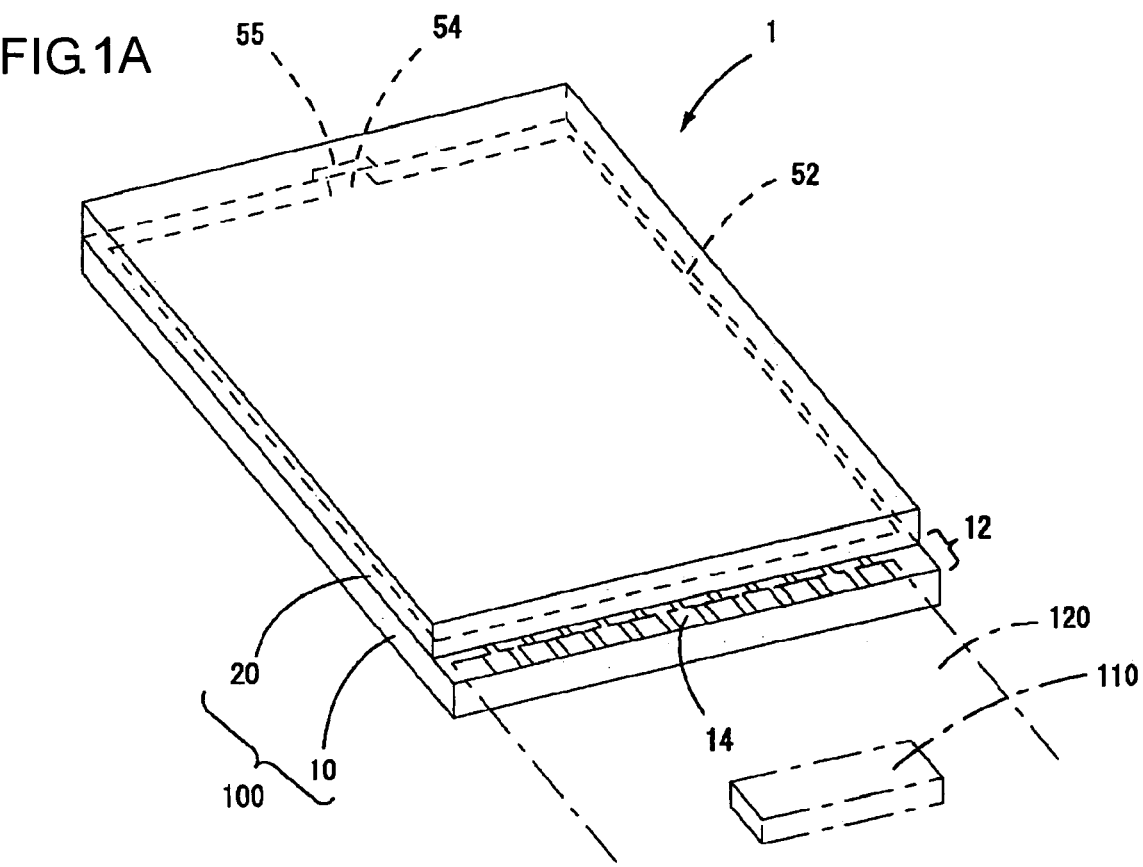
FIG. 1(A) is a perspective view of the structure of a liquid-crystal panel included in an electro-optical device according to the present invention, shown from above an opposing substrate.
Figure 1B:
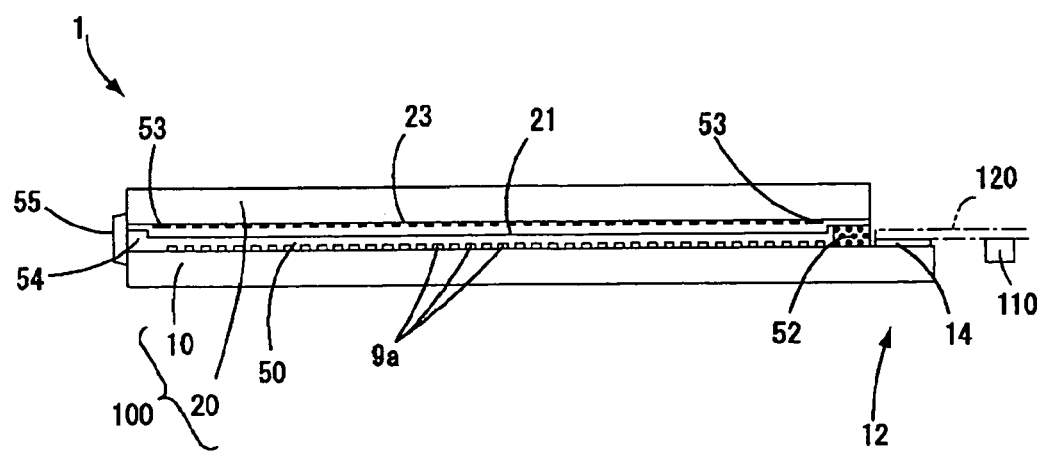
FIG. 1(B) is a cross-sectional view of the structure of the liquid-crystal panel.
Figure 2:
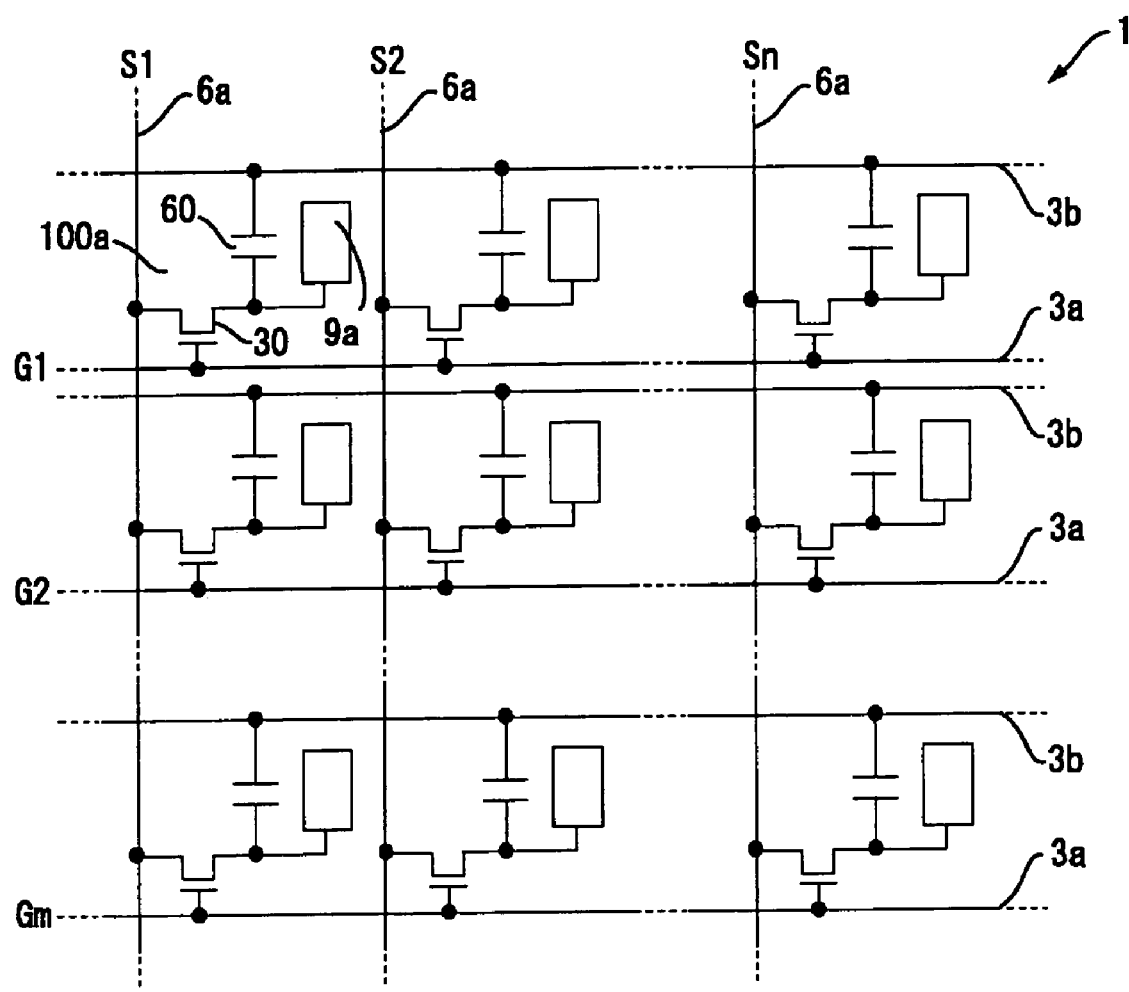
FIG. 2 is an equivalent circuit diagram of various elements, wiring lines and the like in a matrix of pixels in an image display area of the electro-optical device shown in FIGS. 1(A) and 1(B).

FIG. 1(A) is a perspective view of the structure of a liquid-crystal panel included in an electro-optical device according to the present invention, shown from above an opposing substrate. FIG. 1(B) is a cross-sectional view of the structure of the liquid-crystal panel. FIG. 2 is an equivalent circuit diagram of various elements, wiring lines and the like in a matrix of pixels in an image display area of the electro-optical device. In the drawings used for explaining the present embodiments, the magnification scales of layers and components are varied so as to facilitate the identification of those layers and components.

In FIGS. 1(A) and 1(B), an electro-optical device 1 according to this embodiment includes a transmissive or transflective active-matrix liquid-crystal panel 100 and a backlight (not shown). In the liquid-crystal panel 100, liquid crystal 50, serving as an electro-optical substance, is held between a thin-film-transistor-array (TFT-array) substrate 10 (transmissive substrate) and an opposing substrate 20 (transmissive substrate) that are bonded with a rectangular frame-shaped seal 52. A peripheral light-shielding member 53 composed of a light-shielding material is provided along and immediately inside of the inner side of the seal 52. In this embodiment, the TFT-array substrate 10 is larger than the opposing substrate 20. A large number of terminals 14 are disposed along an edge of the TFT-array substrate 10 on an overhanging portion 12 overhanging from the opposing substrate 20. A flexible substrate 120 having a driving integrated circuit (IC) 110 formed thereon by chip-on-flex (COF) technology is connected to these terminals 14. Instead of the driving IC 110 formed on the flexible substrate 120, a data-line-driving circuit or a scanning-line-driving circuit may be formed on the TFT-array substrate 10. Furthermore, the driving IC 110 may be formed on the TFT-array substrate 10 by chip-on-glass (COG) technology instead of COF technology.

A matrix of pixel electrodes 9a is formed on the TFT-array substrate 10. A grid-shaped light-shielding film 23, referred to as a black matrix, a black stripe, or the like, is disposed on the opposing substrate 20 between adjacent pixel electrodes 9a of the TFT-array substrate 10. An opposing electrode 21 composed of an indium tin oxide (ITO) film is provided above the light-shielding film 23. When the electro-optical device 1 is used as a color display, RGB color filters are provided on the opposing substrate 20 at regions corresponding to the pixel electrodes (described later) of the TFT-array substrate 10 during the formation of a surface protective film of the opposing substrate 20.

The polarizers or the like are disposed on the liquid-crystal panel 100 in predetermined directions according to the type of the liquid crystal 50 to be used, in other words, operational modes such as a twisted nematic (TN) mode and a super TN (STN) mode, or a normally white mode or a normally black mode. In this embodiment, sheet polarizers are disposed as described below.

As shown in FIG. 2, a matrix of pixels 100a is provided in the image display area of the liquid-crystal panel 100 having the above-described structure. Each of the pixels 100a has one pixel electrode 9a, and one pixel-switching TFT 30 (thin film semiconductor element) to drive the pixel electrode 9a. Data lines 6a for supplying pixel signals S1, S2, . . . , Sn are electrically connected to the respective sources of the TFTs 30. The pixel signals S1, S2, . . . , Sn written in the data lines 6a may be supplied line-sequentially in this order, or may be supplied to groups of two adjacent data lines 6a. Scanning lines 3a are electrically connected to the respective gates of the TFTs 30, and pulsed scanning signals G1, G2, . . . , Gm are applied to the respective scanning lines 3a at a predetermined timing line-sequentially in this order. The pixel electrodes 9a are electrically connected to the respective drains of the TFTs 30, and the pixel signals S1, S2, . . . , Sn supplied by the data lines 6a are written in the respective pixels at a predetermined interval by switching on the TFTs 30, namely switching elements, for a predetermined period. The pixel signals S1, S2, . . . , Sn at a predetermined level written in the liquid crystal 50 through the pixel electrodes 9a in this manner are retained between the pixel electrodes 9a and the opposing electrode 21 of the opposing substrate 20 shown in FIG. 1(B) for a predetermined period.

Since the alignment and order of molecules change according to the applied voltage level, the liquid crystal 50 modulates light and can provide a gray scale. Since this embodiment adopts the normally white mode, the light density of the incident light passing through this liquid crystal 50 decreases with the applied voltage. As a result, light exhibiting a contrast according to the pixel signals S1, S2, . . . , Sn is emitted from the electro-optical device 1.

To prevent the retained pixel signals S1, S2, . . . , Sn from leaking, storage capacitors 60 may be added in parallel to the liquid-crystal capacitors defined between the pixel electrodes 9a and the opposing electrode 21. The voltage of the pixel electrodes 9a, for example, is retained by the storage capacitors 60 (thin film capacitor elements) for a period that is three orders of magnitude longer than the period for which the source voltage is applied. As a result, charge retention is improved and the electro-optical device 1 exhibiting a high contrast can be provided. As shown in FIG. 2, the storage capacitors 60 may be connected to capacity lines 3b, namely wiring lines for forming the storage capacitors 60, or may be connected to the scanning lines 3a in the upper rows.

[Structure of the Sheet Polarizer]

Figure 3A:
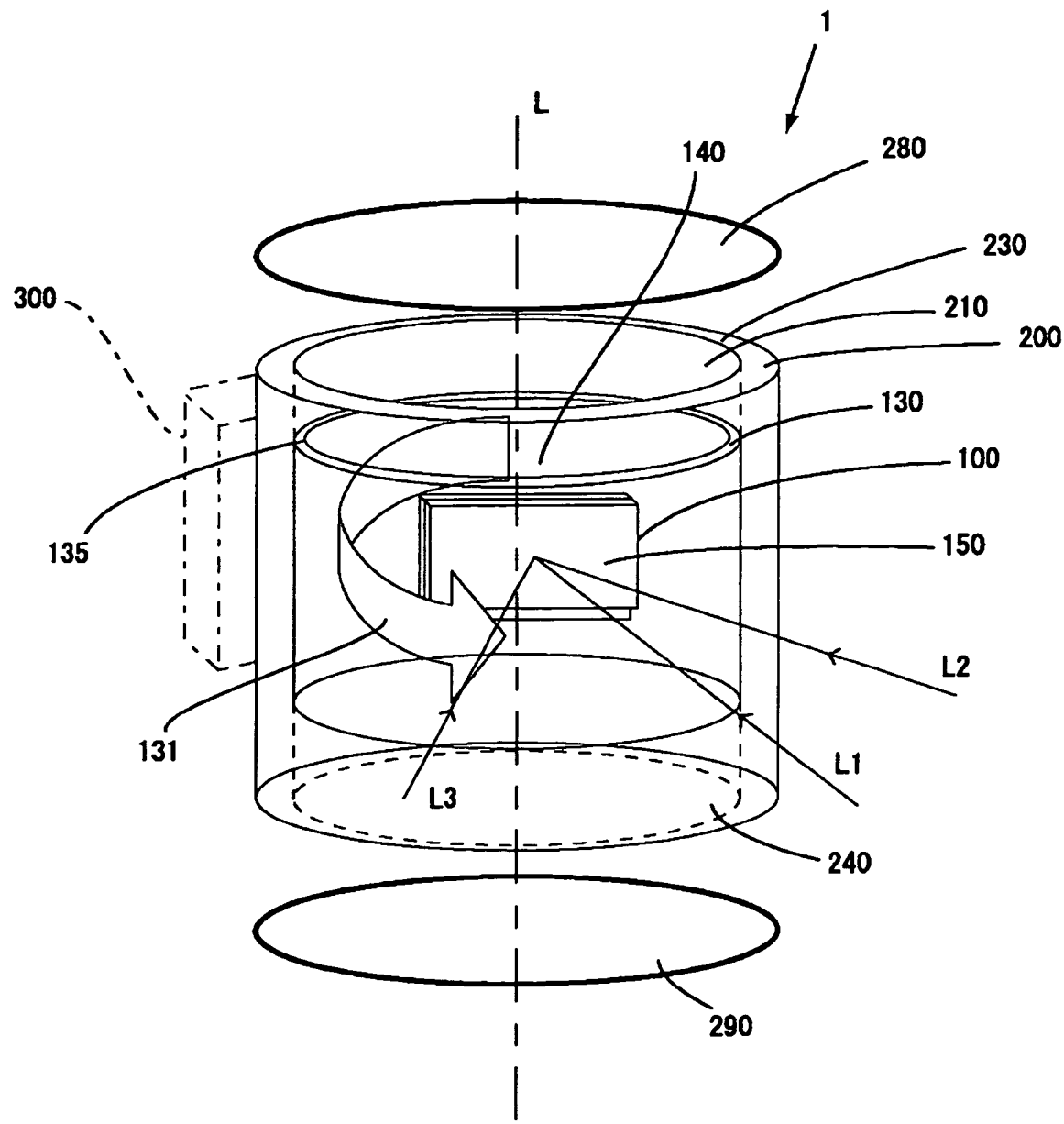
FIG. 3 illustrates an electro-optical device according to an embodiment of the present invention (FIG. 3A, including a polarizing sheet according to an embodiment of the present invention (FIG. 3B).
Figure 3B:
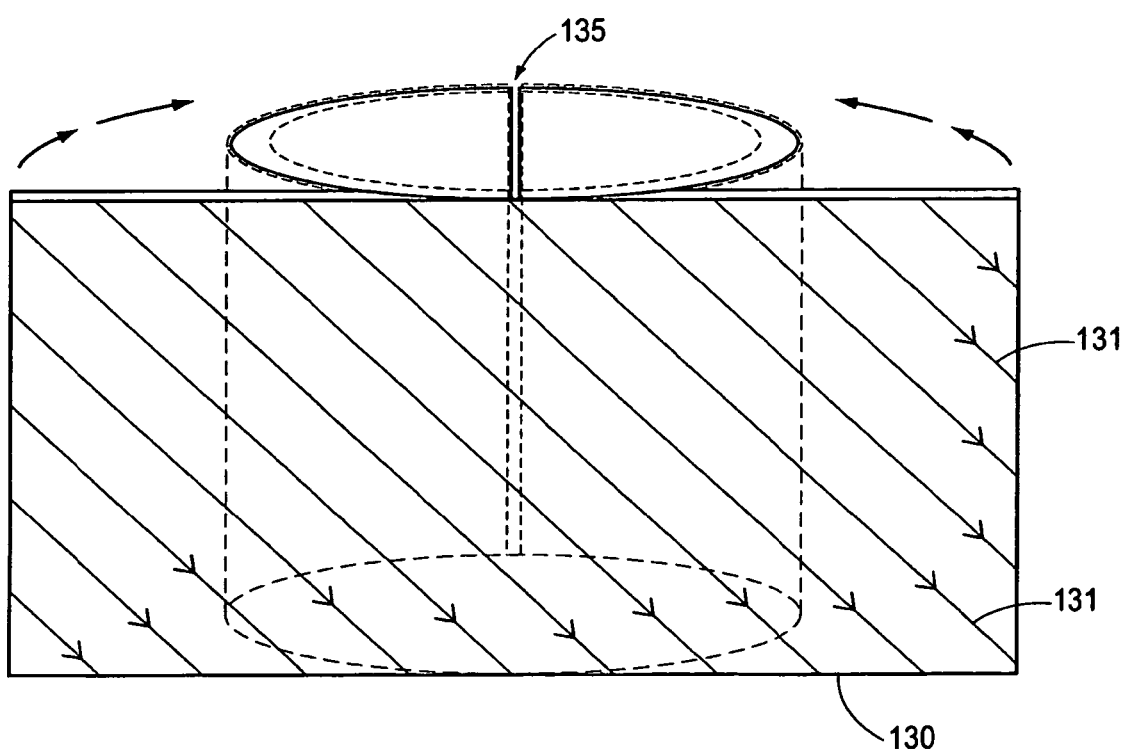

FIG. 3 (including FIGS. 3A and 3B) illustrates the structure of the electro-optical device 1 of this embodiment.

In the electro-optical device 1 of this embodiment shown in FIG. 3, the molecules of the liquid crystal 50 shown in FIG. 1(B) are twisted by 90° between the substrates. According to such a molecular alignment of the liquid crystal, the first polarizer 140 and the second polarizer 150 are disposed in cross-Nicol arrangement adjacent to the back face and the front face, respectively, of the liquid-crystal panel 100.

To dispose the first polarizer 140 and the second polarizer 150 as described above, the liquid-crystal panel 100 in this embodiment is disposed substantially in the center of a transparent cylindrical container 200 that coaxially surrounds a virtual axis line L extending vertically parallel to the surface of the liquid-crystal panel 100. A rectangular polarizing sheet 130 is bonded or mechanically fixed to the entire circumference of the inner surface 210 of the cylindrical container 200. Consequently, the polarizing sheet 130 is curved and surrounds the virtual axis line L. A side edge of the liquid-crystal panel 100 is aligned with a seam 135 of the polarizing sheet 130.

In this embodiment, the top opening 230 and the bottom opening 240 of the transparent cylindrical container 200 are sealed with light-shielding disks 280 and 290, respectively, so that no light enters the inside of the cylindrical container 200 from the top opening 230 and the bottom opening 240.

In this embodiment, a backlight 300 is disposed outside the cylindrical container 200 adjacent to the back face of the liquid-crystal panel 100.

The polarization axis 131 of the polarizing sheet 130 is biased from each side of the sheet. In this embodiment, the polarization axis 131 is biased by an angle of 45° with respect to the long side of the polarizing sheet 130. In the longitudinal direction of the polarizing sheet 130, a portion of the cylindrical polarizing sheet centered on the virtual axis line L adjacent to the back face of the liquid-crystal panel 100 is defined as the first polarizer 140 and a portion of the cylindrical polarizing sheet centered on the virtual axis line L adjacent to the front face of the liquid-crystal panel 100 is defined as the second polarizer 150. In this manner, the first polarizer 140 and the second polarizer 150 are disposed in cross-Nicol arrangement.

In the above-described electro-optical device 1, the molecules of the liquid crystal 50 are twisted, for example by 90°, between the TFT-array substrate 10 and the opposing substrate 20 shown in FIG. 1(B). Therefore, the light emitted from the backlight 300 is polarized linearly in a predetermined direction by the first polarizer 140 and is incident on the liquid-crystal panel 100. When no electric field is applied to keep the molecules of the liquid crystal 50 in the pixels twisted, the polarization axis of the incident light is twisted by the liquid crystal 50 and the light passes through the second polarizer 150. In contrast, when an electric field is applied to cancel the twisted state of the liquid crystal 50 in the pixels, the polarization axis of the incident light is not twisted and the light does not pass through the second polarizer 150. Therefore, predetermined images can be displayed by controlling the electric field in each pixel.

The first polarizer 140 and the second polarizer 150 are the portions of one cylindrical polarizing sheet 130 centered on the virtual axis line L adjacent to the back face and the front face, respectively, of the liquid-crystal panel 100. Accordingly, the polarization axes of the first polarizer 140 and the second polarizer 150 intersect at an angle of 90° when viewed from the direction normal to the liquid-crystal panel 100, namely in the direction of the arrow L1. Moreover, the polarization axis of the first polarizer 140 and the polarization axis of the second polarizer 150 also consistently intersect at an angle of 90° even when viewed from a direction oblique from the normal direction, represented as the arrows L2 and L3. Consequently, images displayed in the liquid-crystal panel 100 exhibit a high contrast when viewed from all directions.

Furthermore, since the single polarizing sheet 130 functions as both the first polarizer 140 and the second polarizer 150 in this embodiment, the angle defined by the polarization axes of a pair of polarizers 140 and 150 is always constant and thus images exhibit a high contrast even when the liquid-crystal panel 100 is viewed from all directions.

The seam 135 joining the ends of the polarizing sheet 130 is disposed so that the side edge of the liquid-crystal panel 100 is aligned with the seam 135 and does not hinder the display of images.

Moreover, since the openings 230 and 240 of the cylindrical container 200 are shielded by the light-shielding disks 280 and 290, light does not enter therefrom. Only the light passing through both the first polarizer 140 and the second polarizer 150 can reach the viewers' eyes. Consequently, images can be displayed in an optimal state.

The polarizers 140 and 150 may be provided along the outer surface of the cylindrical container 200. However, the polarizers 140 and 150 in this embodiment are provided along the inner surface 210 to prevent light from penetrating or leaking through the cylindrical container 200.

Furthermore, the polarizing sheet 130 is fixed on the cylindrical container 200 and is not bonded to the liquid-crystal panel 100 in this embodiment. Since the polarizing sheet 130 does not need to be stripped from the liquid-crystal panel 100, many hours can be saved for reworking the electro-optical device 1 and damage to the liquid-crystal panel 100 can be avoided.

[Other Embodiments]

In the above-described embodiment, a single polarizing sheet 130 is curved and surrounds the virtual axis line L as a centerline, and the portions of the polarizing sheet located adjacent to the back face and the front face of the liquid-crystal panel 100 are defined as the first polarizer 140 and the second polarizer 150, respectively. Two curved polarizing sheets centered on a virtual axis line may be disposed adjacent to the back face and the front face of the liquid-crystal panel, and may function as a first polarizer and a second polarizer, respectively.

Figure 4:
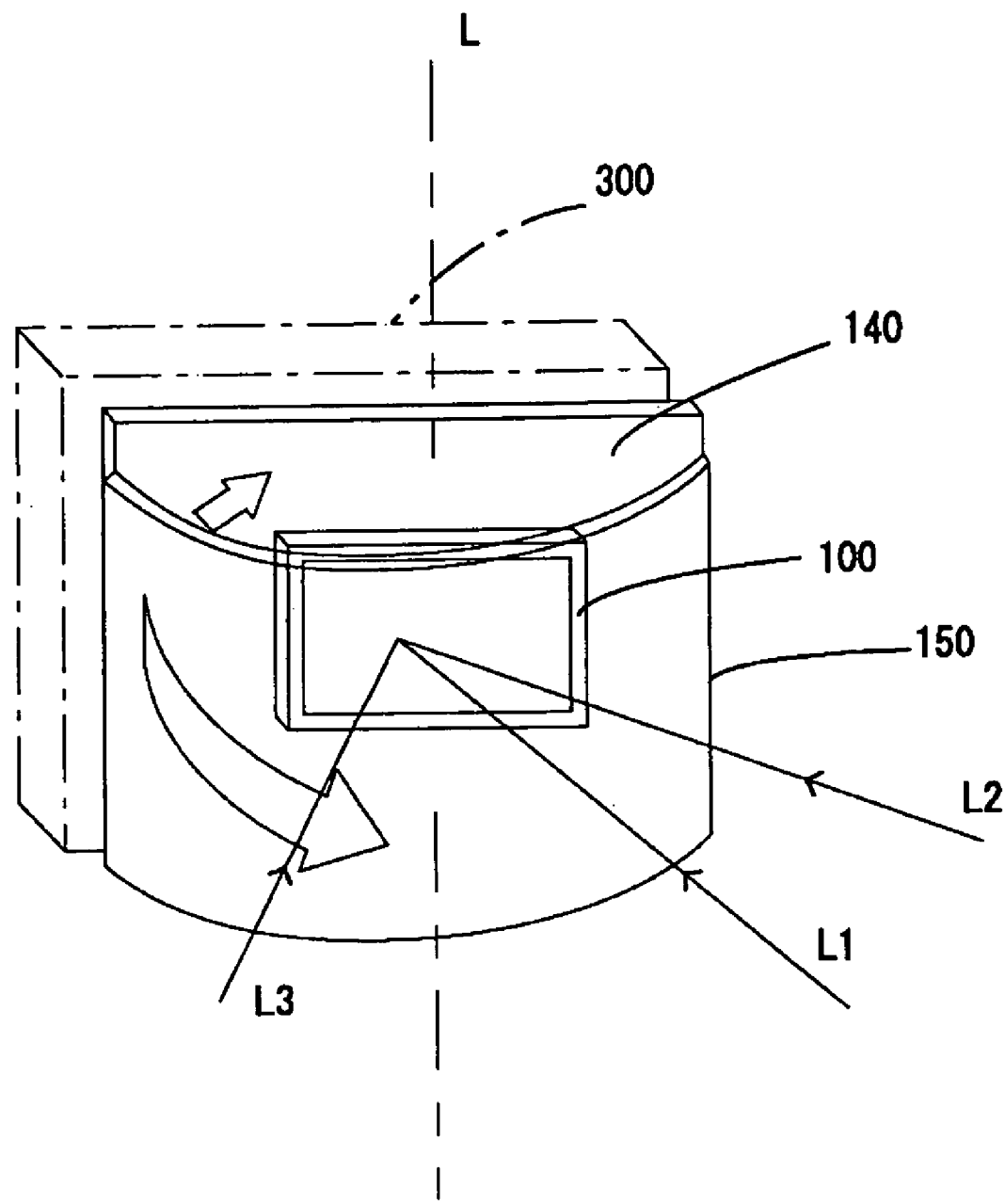
FIG. 4 illustrates the structure of an electro-optical device according to another embodiment of the present invention.
Figure 5A:
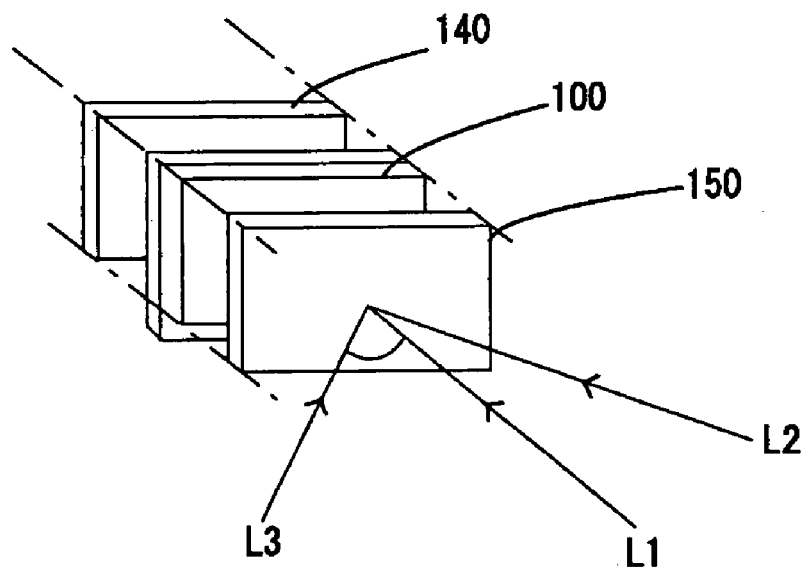
FIG. 5(A) illustrates a known electro-optical device.
Figure 5B:
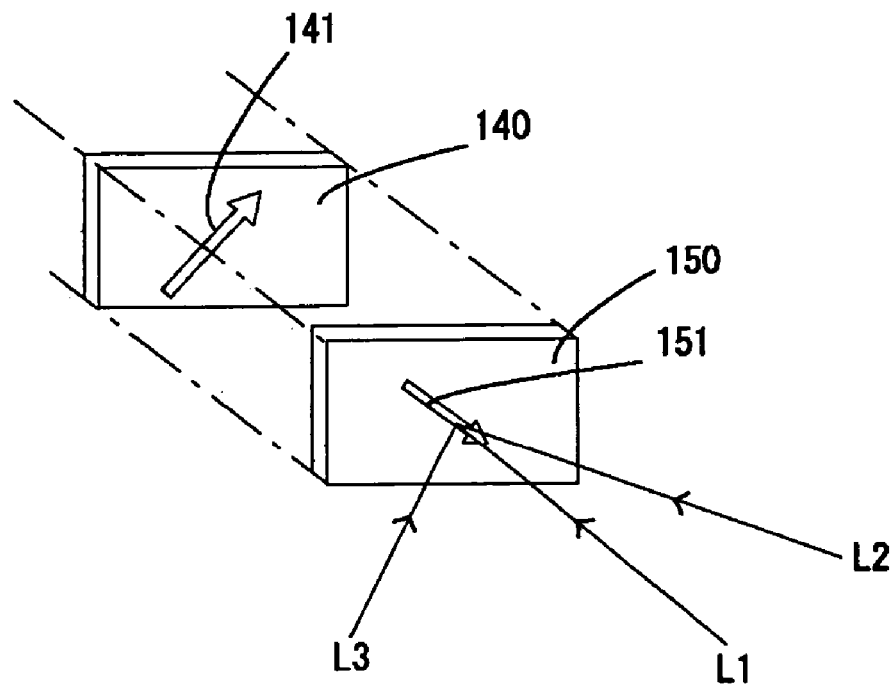
FIG. 5(B) illustrates how the orthogonality of the polarization axes of the polarizers depends on the viewing angle.

In the above-described embodiment, both the first polarizer and the second polarizer are portions of the cylindrical polarizing sheet centered on the virtual axis line L. When the first polarizer 140 is parallel to the liquid-crystal panel 100, and only the second polarizer 150 is curved and centered on the virtual axis line L, as shown in FIG. 4, for example, the viewing-angle range can also be improved compared to the arrangement when both the first polarizer 140 and the second polarizer 150 are parallel to the liquid-crystal panel 100, and contrast in all directions does not change significantly. Contrary to the arrangement in FIG. 4, the second polarizer may be parallel to the liquid-crystal panel and only the first polarizer may be curved and centered on the virtual axis line L.

In the above-described embodiment, an active-matrix liquid-crystal panel having TFTs as pixel-switching elements is described. The present invention is also applicable to electro-optical devices including an active-matrix liquid-crystal panel having thin film diodes (TFDs) as pixel-switching elements or a passive-matrix liquid-crystal panel.

[Application to Electronic Apparatus]

The electro-optical devices according to the present invention are not illustrated. Due to a high contrast regardless of viewing angles, the electro-optical devices are applicable to electronic apparatuses such as a large-format display apparatus on the street or in storefronts.

INDUSTRIAL APPLICABILITY

In the present invention, a first polarizer and a second polarizer are disposed in cross-Nicol arrangement adjacent to the back face and the front face, respectively, of a liquid-crystal panel, and at least one of the first polarizer and the second polarizer is curved and surrounds a virtual axis line defined substantially in the center of the liquid-crystal panel. Thus, the angle defined by the polarization axes of a pair of polarizers does not change significantly even when the liquid-crystal panel is viewed obliquely compared to the arrangement when a pair of polarizers is parallel to each other, and high-contrast images can be achieved even when the liquid-crystal panel is viewed obliquely. Consequently, the electro-optical devices according to the present invention are applicable to electronic apparatuses such as large-format display apparatuses displayed on the street or in storefronts.

What is claimed is:

1. An electro-optical device comprising a liquid-crystal panel holding liquid crystal between a pair of transmissive substrates; a first polarizer disposed adjacent to the back face of the liquid-crystal panel; and a second polarizer disposed adjacent to the front face of the liquid-crystal panel in cross-Nicol arrangement together with the first polarizer, each of the first polarizer and the second polarizer being curved and centered on a virtual axis line defined substantially in the center of the liquid-crystal panel.

2. An electro-optical device comprising a liquid-crystal panel holding liquid crystal between a pair of transmissive substrates; a first polarizer disposed adjacent to the back face of the liquid-crystal panel; and a second polarizer disposed adjacent to the front face of the liquid-crystal panel in cross-Nicol arrangement together with the first polarizer, the first polarizer and the second polarizer being composed of a single polarizing sheet surrounding a virtual axis line defined substantially in the center of the liquid-crystal panel, adjacent to the back face and the front face, respectively, of the liquid-crystal panel.

3. The electro-optical device according to claim 2, a seam at the ends of the polarizing sheet being disposed so that a side edge of the liquid-crystal panel is aligned to the seam.

4. The electro-optical device according to claim 2, the liquid-crystal panel being disposed substantially in the center of a transparent cylindrical container surrounding the virtual axis line, and the polarizing sheet being provided along the inner surface or the outer surface of the cylindrical container.

5. The electro-optical device according to claim 4, the polarizing sheet being fixed on the inner surface or the outer surface of the cylindrical container.

6. The electro-optical device according to claim 4, the polarizing sheet being provided along the inner surface of the cylindrical container.

7. The electro-optical device according to claim 4, openings of the cylindrical container being shielded by light-shielding members.

8. An electronic apparatus including the electro-optical device according to claim 1.

9. An electronic apparatus including the electro-optical device according to claim 2.

* * * * *